E. C. BUELL AND H. L. STEENROD.
POWER HANDSAW.
APPLICATION FILED OCT. 13, 1916. RENEWED AUG. 4, 1919.
1,324,032.
Patented Dec. 9, 1919.
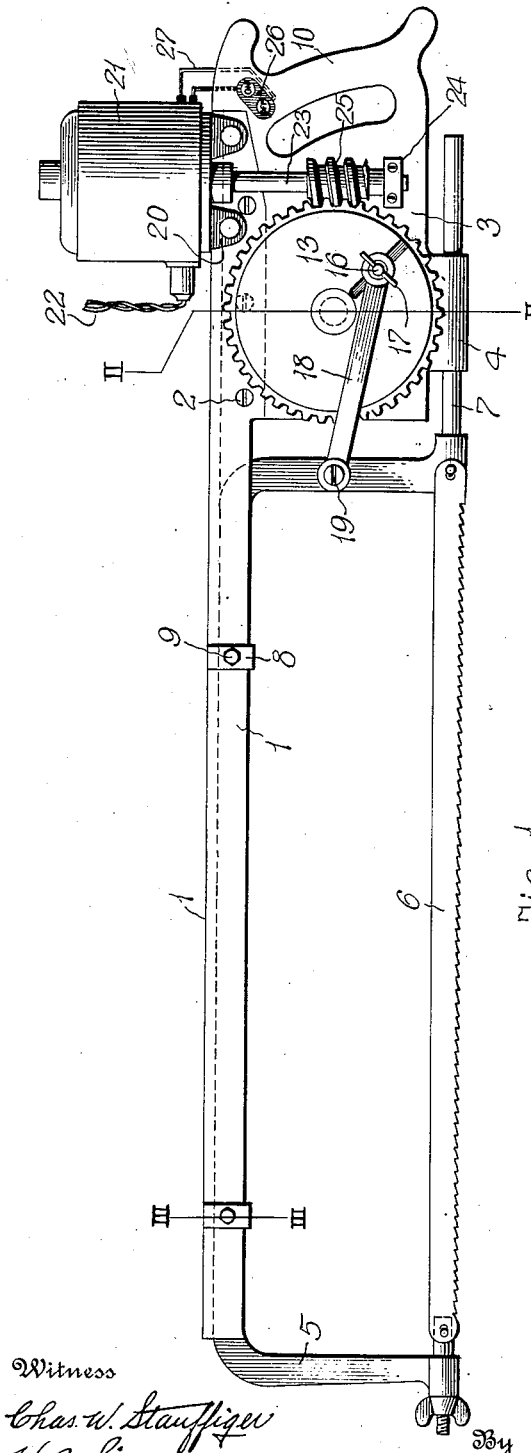
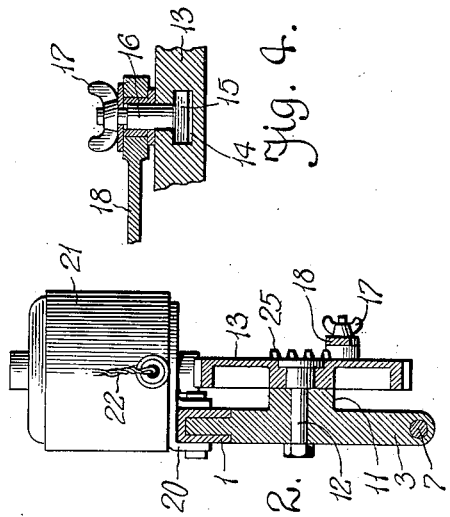
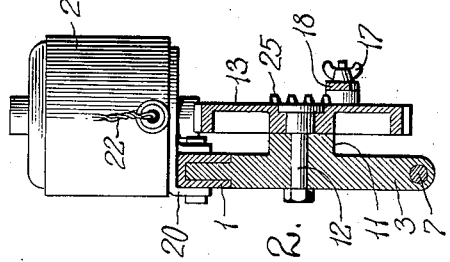
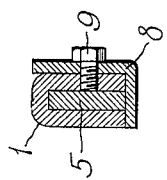
Witness
Chas. W. Stauffiger
H. B. Sisson
Inventors
Edwin C. Buell,
Hilbern L. Steenrod,
By
Attorneys

UNITED STATES PATENT OFFICE.

EDWIN C. BUELL AND HILBERN L. STEENROD, OF DETROIT, MICHIGAN.

POWER-HANDSAW.

1,324,032.      Specification of Letters Patent.      Patented Dec. 9, 1919.

Application filed October 13, 1916, Serial No. 125,462. Renewed August 4, 1919. Serial No. 315,346.

*To all whom it may concern:*

Be it known that we, EDWIN C. BUELL and HILBERN L. STEENROD, citizens of the United States of America, residing at Detroit, in the county of Wayne and State of Michigan, have invented certain new and useful Improvements in Power-Handsaws, of which the following is a specification, reference being had therein to the accompanying drawings.

This invention relates to a power hand saw and the primary object of our invention is to provide an electrically driven hand saw that may be safely manipulated and easily controlled.

Another object of our invention is to provide a saw resembling a butcher's saw or hack saw with a novel guide in which the saw may be reciprocated and a power plant on the guide for imparting movement to the saw.

A further object of our invention is to accomplish the above results by a simple, durable and inexpensive construction which will be hereinafter specifically described and then claimed.

Reference will now be had to the drawing wherein—

Figure 1 is a side elevation of the saw in accordance with our invention;

Fig. 2 is a cross sectional view taken on the line II—II of Fig. 1;

Fig. 3 is a similar view taken on the line III—III of Fig. 1; and

Fig. 4 is a detail sectional view of an adjustable wrist pin adapted to form part of the saw.

In the drawing 1 denotes a channel or inverted U-shaped guide and mounted in the inner end thereof by screws 2 or other fastening means is a flat handle piece 3 having the lower edge thereof provided with a tubular guide 4.

Slidable in the outer portion of the guide 1 is a saw frame or yoke 5 having a detachable and adjustable blade 6. The rear end of the saw frame 5 is provided with a rearwardly extending rod 7 slidable in the guide 4 and coöperating with the guide 4 (in holding the saw frame relative to the guide 1) are angle clips 8 held by set screws 9, said angle clips extending under the guide 1 as best shown in Fig. 3, to serve as supports for the saw frame as it is reciprocated within the guide 1.

The handle piece 3 has a handle proper 10 and one side of said handle piece has a boss 11 for a journal pin 12. Rotatable on the journal pin is a gear wheel 13 disposed in parallelism with the side of the handle piece 3 and said gear wheel has the outer side thereof provided with a radially disposed slot 14 inverted T-shaped in cross section, as shown in Fig. 4. Slidable in the slot 14 is the head 15 of a wrist pin 16 and said wrist pin is adapted to be fixed relative to the gear wheel 13 by a wing thumb nut 17 mounted on the wrist pin.

Loose on the wrist pin 16 is a connecting rod or pitman 18, said connecting rod having the end thereof pivotally connected, as at 19 to the inner end of the saw frame 5.

Mounted on the inner end of the guide 1 is a bracket 20 supporting a vertically disposed electric motor 21. This motor has suitable lead-in wires 22 so that it may be operated from a suitable source of electrical energy, for instance an ordinary lighting circuit. The motor has the armature shaft 23 thereof vertically disposed to extend downwardly at the side of the handle piece 3 and the lower end of said armature shaft is journaled in a suitable bearing 24 carried by the handle piece. Mounted on the shaft 23 is a worm 25 meshing with the gear wheel 13 so that said gear wheel will be revolved and the saw frame reciprocated when the electric motor 21 is placed in operation.

To control the operation of the electric motor, the handle 10 has a suitable switch, as "on" and "off" push buttons 26 connected to the motor by wires 27, thus permitting of the motor being started and stopped at will.

From the foregoing it will be observed that the saw frame 5 and the blade 6 are of a conventional type and that the rod 7 is substituted for the usual handle. It is then possible to place the frame 5 in our saw guide and reciprocate the same, while the saw is guided and proper pressure brought to bear at the handle 10. The stroke of the saw frame 5 may be easily regulated by adjusting the wrist pin 16, either toward the journal pin 12 of the gear wheel 13 or toward the periphery of said wheel.

One embodiment of our invention has been illustrated, but we desire it to be understood that the structural elements are susceptible to such changes as fall within the scope of the appended claim.

What we claim is:—

In a power hand saw, the combination with a saw, and means adapted for reciprocating said saw, of a channel guide for said saw, and angle clips connected to one side of said channel guides and extending under said channel guides to retain said saw therein.

In testimony whereof we affix our signatures in presence of two witnesses.

EDWIN C. BUELL.
HILBERN L. STEENROD.

Witnesses:
ANNA M. DORR,
KARL H. BUTLER.